(12) United States Patent
Wang et al.

(10) Patent No.: US 9,975,040 B2
(45) Date of Patent: May 22, 2018

(54) PROCEDURAL NAVIGATION GRAPHS FOR IDENTIFYING A ROUTE FOR A VIRTUAL OBJECT

(71) Applicant: Apple Inc., Cupertino, CA (US)

(72) Inventors: Norman N. Wang, San Jose, CA (US); Jacques P. Gasselin de Richebourg, Sunnyvale, CA (US); Bruno M. Sommer, Cupertino, CA (US); Ross R. Dexter, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/732,744

(22) Filed: Jun. 7, 2015

(65) Prior Publication Data

US 2016/0358378 A1    Dec. 8, 2016

(51) Int. Cl.
| | |
|---|---|
| *G06T 15/00* | (2011.01) |
| *A63F 13/00* | (2014.01) |
| *G06Q 10/04* | (2012.01) |
| *G01C 21/20* | (2006.01) |

(52) U.S. Cl.
CPC ........... *A63F 13/00* (2013.01); *G06Q 10/047* (2013.01); *G01C 21/20* (2013.01)

(58) Field of Classification Search
CPC ............................... G06T 19/00; G06T 17/20
USPC ........................................................ 345/419
See application file for complete search history.

(56) References Cited

U.S. PATENT DOCUMENTS

| | | | |
|---|---|---|---|
| 8,111,257 B2 | 2/2012 | Axelrod | |
| 2003/0048849 A1* | 3/2003 | Tomita, Jr. | G06T 7/2033 375/240.25 |
| 2008/0220862 A1* | 9/2008 | Axelrod | G06T 11/206 463/31 |
| 2009/0150790 A1* | 6/2009 | Wilhelm | A63F 13/10 715/737 |
| 2012/0069051 A1 | 3/2012 | Hagbi | |

OTHER PUBLICATIONS

AR Várkonyi-Kóczy, A Complexity Reduced Hybrid Autonomous Navigation Method for In-Door Robots, The IPSI BgD Transactions on Internet Research, 2010.*
Aron Laszka, Annamária R. Várkonyi-Kóczy, Gábor Pék, Péter Várlaki, "Universal autonomous robot navigation using quasi optimal path generation", ICARA, 2009.*

(Continued)

*Primary Examiner* — Jin Ge
(74) *Attorney, Agent, or Firm* — Blank Rome LLP (57) ABSTRACT

Techniques to automatically generate a navigation graph for a given environment and agent are disclosed. The environment may include an arbitrary number of polygonal obstacles arbitrarily arranged, concave or convex, static or dynamic. The disclosed operation extrudes (in a specified manner) the vertex of each obstacle. The extruded vertices comprise the navigation graph's nodes. Each object's extruded vertices may be joined to form a corresponding extruded object. Paths may then be identified by attempting to connect every extruded vertex with every other extruded vertex. Those paths intersecting any of the extruded objects are rejected as possible paths. In some embodiments, paths that are oriented in approximately the same direction having approximately the same length may be removed as being redundant.

15 Claims, 11 Drawing Sheets

(56) References Cited

OTHER PUBLICATIONS

Borovikov, Igor, "Navigation Graph Generation," Gamedev.net, Jun. 28, 2011.
Kang, et al., "Tour Into the Video: Image-based Navigation Scheme for Video Sequences of Dynamic Scenes," VRST '02, Nov. 11-13, 2002, Hong Kong.

* cited by examiner

CONCAVE POLYGON                     CONVEX POLYGON

CONCAVE POLYGON        CONVEX POLYGON

PROCEDURAL NAVIGATION GRAPHS FOR IDENTIFYING A ROUTE FOR A VIRTUAL OBJECT

BACKGROUND

One challenge in the design of computer games is agent movement—the motion of an entity or object through its environment. Pathfinding strategies have the task of finding a path from any coordinate in a game world to any other (possible) coordinate under a given set of constraints. Pathfinding systems take as input a starting point, a destination point, knowledge of its environment (e.g., where obstacles are located), and information regarding the agent if relevant; they then find a series of points that constitute one or more paths the agent can follow to navigate from its starting point to its destination point.

A game's world geometry is often stored in a structure referred to as a "map" and usually contains all of the polygons that make up the game's environment. To reduce the amount of computation required, a game's map is often simplified. The pathfinder uses these simplified representations to determine a path from start to end. The most common forms of simplified representations are navigation meshes and waypoints. A navigation mesh is a set of convex polygons that describe the walkable surface of a three-dimensional (3D) environment. Waypoints are a collection of nodes with links between them. Waypoints are useful for creating efficient obstacle free paths through static maps but are generally unable to deal with dynamic worlds.

SUMMARY

In one embodiment the disclosed concepts provide a method to automatically generate a navigation graph. The method includes receiving a scene or environment having two or more polygonal obstacles and information concerning an object that is designated to move through the scene or environment. Next, extruded vertices are generated for each vertex of each polygonal obstacle by: extending, for each edge adjacent to a vertex, a rectangle for a distance based on the object's characteristics, wherein the rectangle's two sides extending from the edge are perpendicular to the edge, a third side of the rectangle is parallel to and coincident with the edge and a fourth side is parallel to the edge; identifying, when the extruded rectangles of adjacent sides of the vertex intersect, a top-most intersection point as the extruded vertex; and identifying, when the extruded rectangles of adjacent sides of the vertex do not intersect, that point at which two lines intersect, wherein a first of the two lines is a line parallel and coincident to the fourth side of the extruded rectangle on one of the vertices two adjacent edges and the second of the two lines is a line parallel and coincident to the fourth side of the extruded rectangle on the other one of the vertices two adjacent edges. Each of the extruded vertices of each polygon may be identified as a node in the navigation graph. Next, each extruded vertex of each polygon may be connected to the polygon's adjacent vertices to form or create an extruded object or boundary. Possible paths may be generated by connecting each extruded vertex with each other extruded vertex by straight lines. Possible paths that intersect an extruded boundary may be rejected. The remaining paths comprising the edges of the navigation graph. In another embodiment, redundant edges may be removed. In yet another embodiment, weights or any desired function may be assigned to the navigation graph's edges or paths. In still another embodiment, program code to implement the disclosed techniques may be prepared (in any language) and stored in any media that is readable and executable by a computer system.

DETAILED DESCRIPTION

This disclosure pertains to systems, methods, and computer readable media to improve the operation of a graphics system. Techniques disclosed herein may be used to automatically generate a navigation graph for a given environment and agent. The environment may include an arbitrary number of polygonal obstacles arbitrarily arranged, concave or convex, static or dynamic. The disclosed operation extrudes (in a specified manner) the vertex of each obstacle. The extruded vertices comprise the navigation graph's nodes. Each object's extruded vertices may be joined to form a corresponding extruded object. Paths may then be identified by attempting to connect every extruded vertex with every other extruded vertex. Those paths intersecting any of the extruded objects are rejected as possible paths. In some embodiments, paths that are oriented in approximately the same direction having approximately the same length may be removed as being redundant.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics systems in general and game systems in particular, having the benefit of this disclosure.

Figure 1:
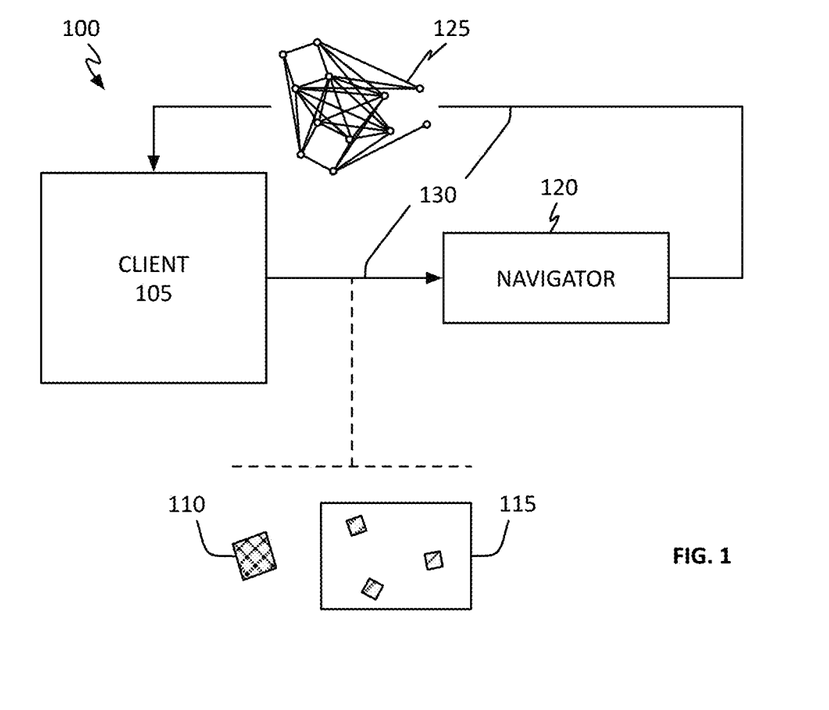
FIG. 1 shows, in block diagram form, a system in accordance with one embodiment.

Referring to FIG. 1, system 100 in accordance with one embodiment includes client 105 that uses agent 110 and either provides or generates scene 115 through which agent 110 must be able to navigate. Scene 115 may contain an arbitrary number and arrangement of obstacle polygons. Navigator 120 uses a novel technique to automatically and rapidly generate navigation graph 125 (a structure identifying those points and paths within scene 115 that agent 110 may assume) for any given scene 115 that guarantees there is no region within scene 115 that agent 110 cannot reach. Client 105 may use navigation graph 125 to plan agent 110's movement through scene 115. In one embodiment client 105 and navigator 120 may be different aspects of a common application executing on the same computer system. In another embodiment client 105 may be one or more applications and navigator 120 another one or more applications executing on the same computer system. In general client 105 may be any application that needs to track an object (e.g., agent 110) through an area (e.g., scene 100) without itself needing to determine where in the given area the object may traverse. Similarly, navigator 120 may be any application or procedure that provides the disclosed functionality. By way of example navigator 120 may be a user-level application or functionality accessed through a an application programming interface (API). In still another embodiment client 105 may execute on one computer system while navigator 120 executes on another computer system. In implementations taking this approach, path 130 may represent one or more networks, each of which may take any form including, but not limited to, local area networks and wide area networks such as the Internet. Further, path 130 may use any desired technology (wired, wireless or a combination thereof) and communication protocol (e.g., TCP, or transmission control protocol and PPP, or point to point).

Figure 2:
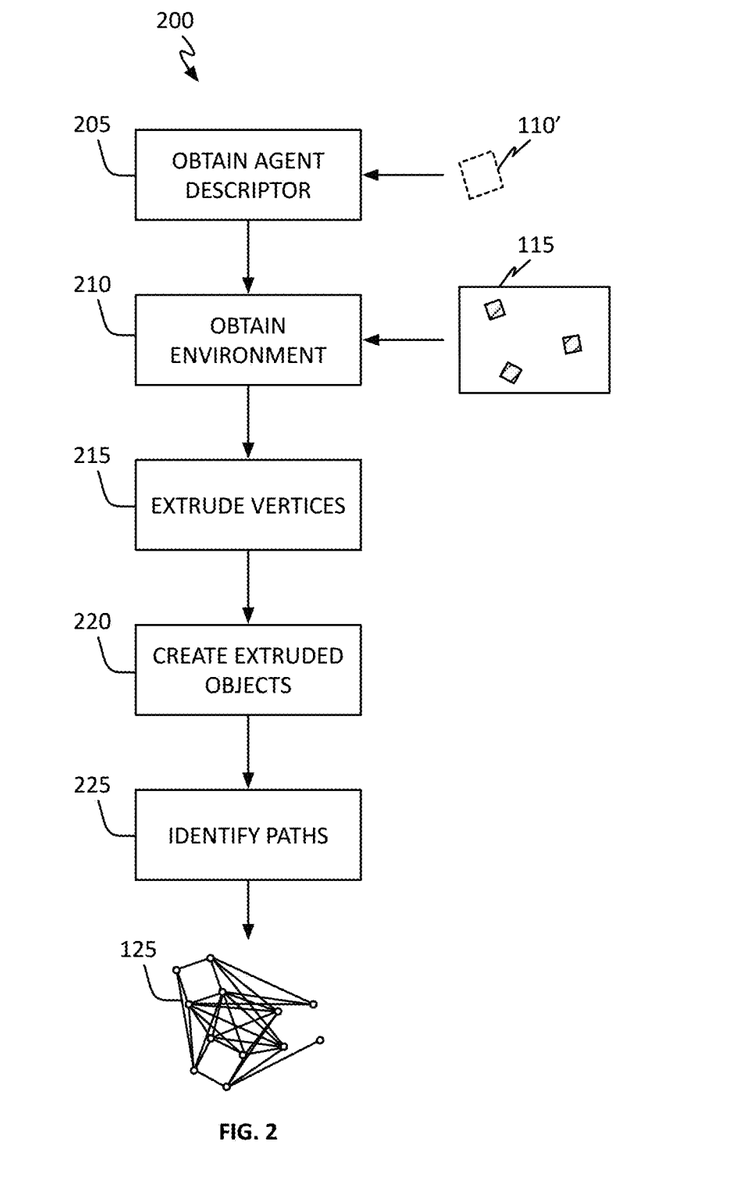
FIG. 2 shows, in flowchart form, navigation graph generation in accordance with one embodiment.

Referring to FIG. 2, navigation graph operation 200 in accordance with one embodiment may begin with navigator 120 obtaining agent descriptor information 105' and scene 115 (blocks 205 and 210). One type of agent descriptor information may include the agent's bounding radius. Another type of agent descriptor information may include a structure identifying the agent's perimeter. Scene 115 may contain an arbitrary number and arrangement of obstacle polygons, any of which may be concave or convex, static or dynamic: a concave polygon is a polygon having one or more interior angles greater than 180°; a convex polygon is a polygon whose interior angles are all less than 180°; a static polygon has a fixed position within scene 115; and a dynamic polygon may change its position during the time navigator 120 generates navigation graph 125. The vertices of all polygons within scene 115 may then be extruded by an amount based on the agent's bounding radius (block 215). As used herein the term "extrusion" means to extend a polygon's vertex in such a fashion as to minimally encompass a given agent subject to constraints applied by the vertices two adjacent edges (see below). From each polygon's extruded vertex an extruded object may be generated (block 220). In one embodiment this may be done by connecting each polygon's extruded vertex to each of its adjacent extruded vertices. The obstacle polygon's extruded vertices comprise the nodes in navigation graph 125. To identify paths, an attempt may be made to create a connection between all of the vertices of all of the extruded obstacle polygons. Any connection that intersects any of the extruded obstacle polygons (even self intersection) may be removed (block 225). In one embodiment, this may complete the generation of navigation graph 125. In another embodiment a simplification operation may be applied to eliminate redundant paths. For example, connections between different nodes having approximately the same direction and/or approximately the same length may be removed as effectively being redundant. What constitutes the "same" or "approximately the same" will, of course, vary from implementation to implementation, dependent upon the needs and purpose of a given implementation. In one embodiment length and orientation thresholds may be specified so that if two paths have lengths differing by less than the specified length threshold they may be considered to be the "same" length. Similarly, if two paths have orientations (e.g., are pointed in the same direction) that differ by less than the specified orientation threshold they may be considered to point in the same direction (e.g., have the same orientation).

Figure 3A:
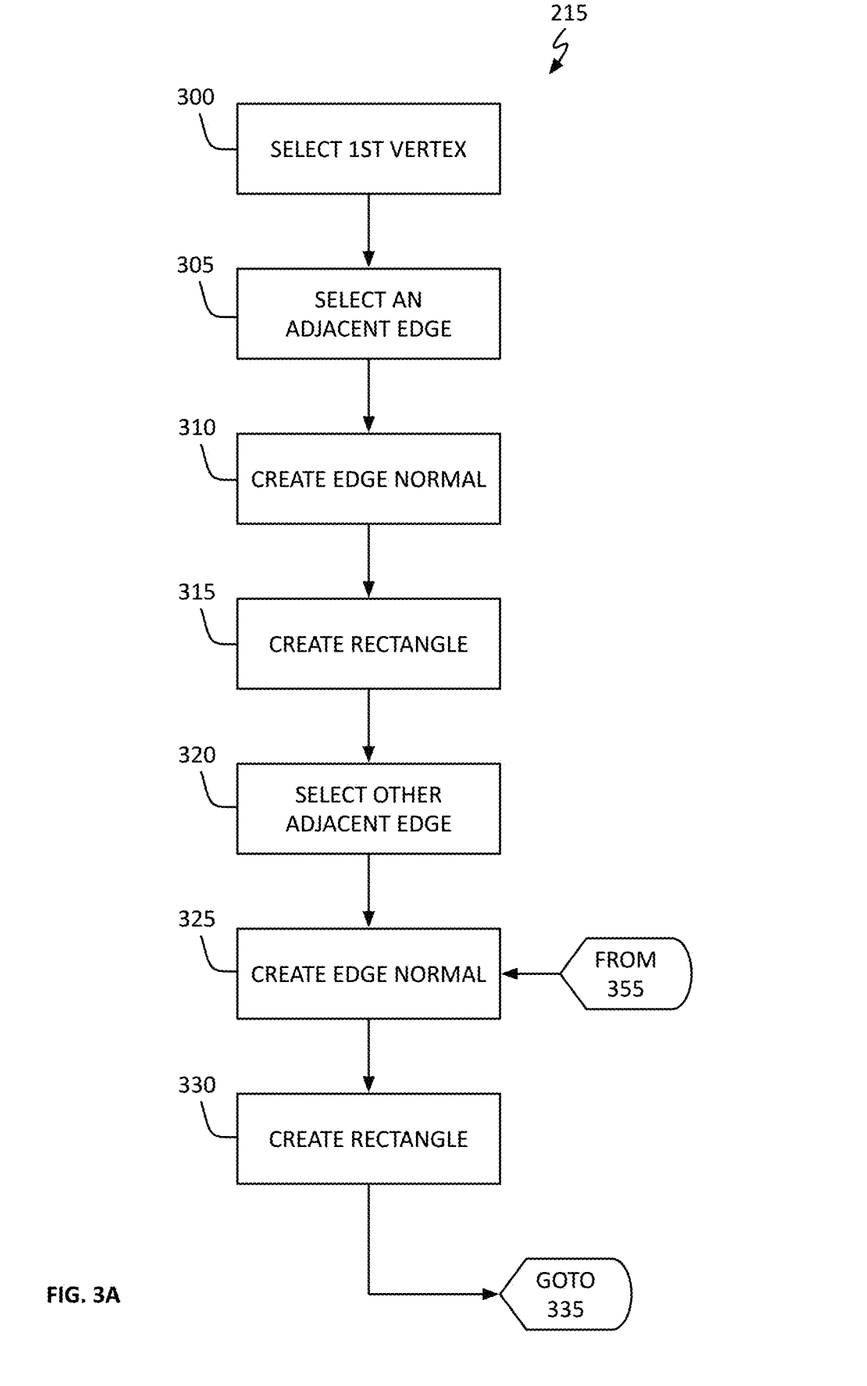
FIGS. 3A and 3B show, in flowchart form, a vertex extrusion operation in accordance with one embodiment.
Figure 3B:
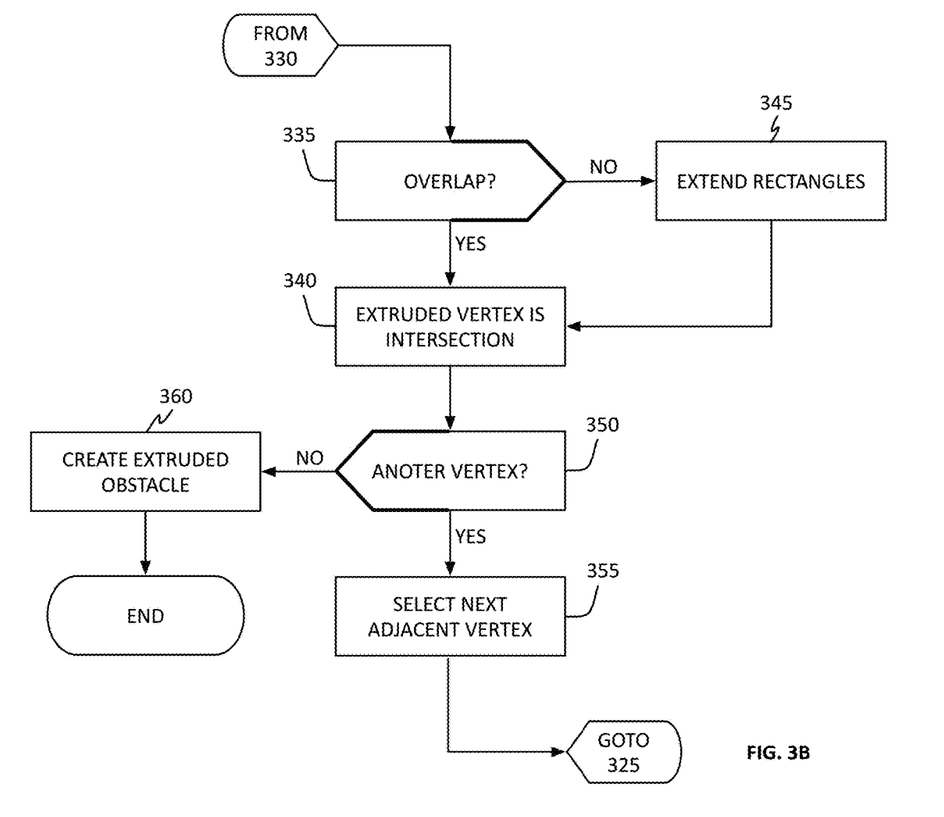
Figure 4A:
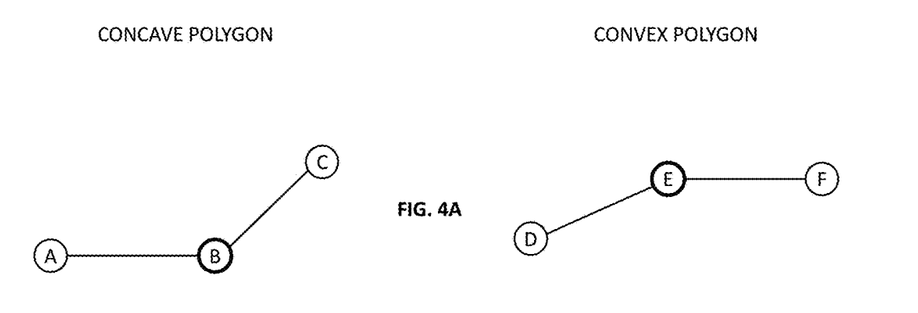
FIGS. 4A-4H illustrate certain vertex extrusion actions as to concave and convex polygons in accordance with one embodiment.
Figure 4B:
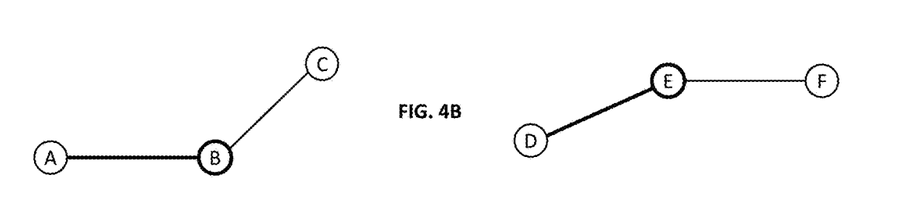
Figure 4C:
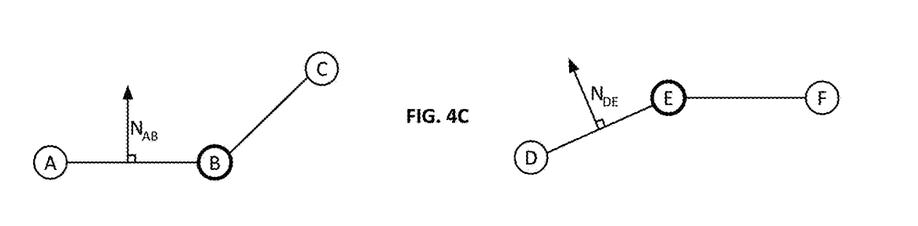
Figure 4D:
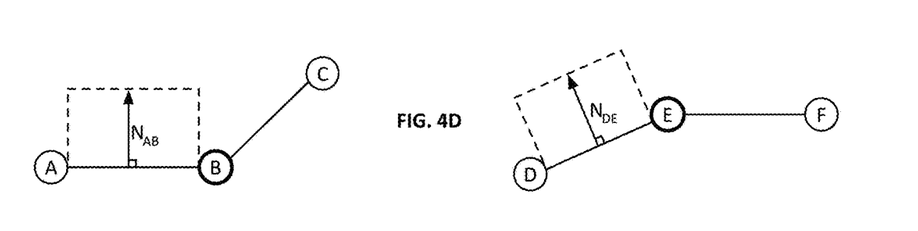
Figure 4E:
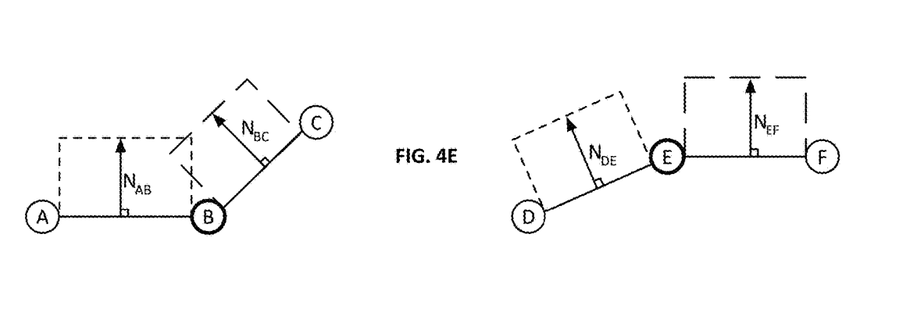
Figure 4F:
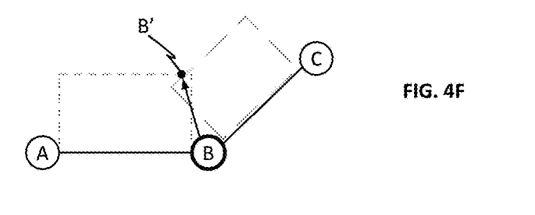
Figure 4G:
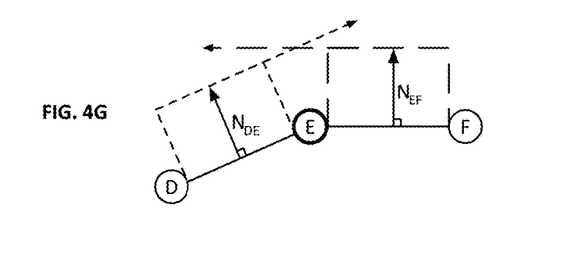
Figure 4H:
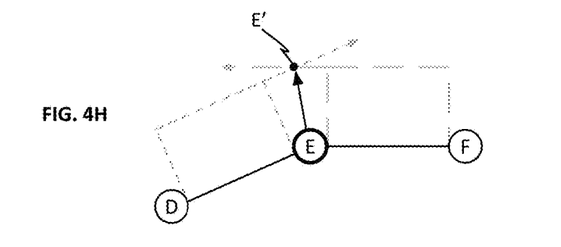

Referring now to FIGS. 3 and 4, a more detailed description of how extruded vertices may be created is provided (e.g., block 215). To begin, a first node of a first obstacle polygon may be selected (block 300): vertices B and E in FIG. 4A. A first edge of the selected vertex may be chosen (block 305): edges AB and DE in FIG. 4B. An edge normal to the selected edge can then be made (block 310): normal $N_{AB}$ and $N_{DE}$ in FIG. 4C, with the length of the edge normal equal to the agent's bounding radius. Next, a rectangle extending perpendicularly from the selected edge and having a depth equal to the edge normal may be created (block 315): see FIG. 4D. These actions may be repeated for the selected vertices other edge (blocks 420-430): see FIG. 4E. Referring now to FIG. 3B, a check may now be made to determine if the selected vertices edge rectangles intersect (block 335). As shown in FIG. 4E, those edge rectangles corresponding to the concave polygon do intersect (the "YES" prong of block 335), so the top-most intersection point B' may be taken as the extruded vertex (block 340): see FIG. 4F. Also shown in FIG. 4E, edge rectangles corresponding to the convex polygon do not intersect (the "NO" prong of block 335), so the top surface of each edge's rectangle may be extended in toward the selected vertex until they intersect (block 345): see FIG. 4G. The intersection point E' of the extended rectangle edges may be taken as the extruded vertex (block 340); see FIG. 4H. If the polygon has at least one more vertex to extrude (the "YES" prong of block 350), the next adjacent vertex that has not yet been extruded is selected (block 355) where after vertex extrusion operation 215 continues at block 325. If all of the polygon's vertices have been extruded (the "NO" prong of block 350), the polygon's extruded object may be created by connecting each of the extruded vertices to each of its adjacent extruded vertices (block 360).

Figure 5A:
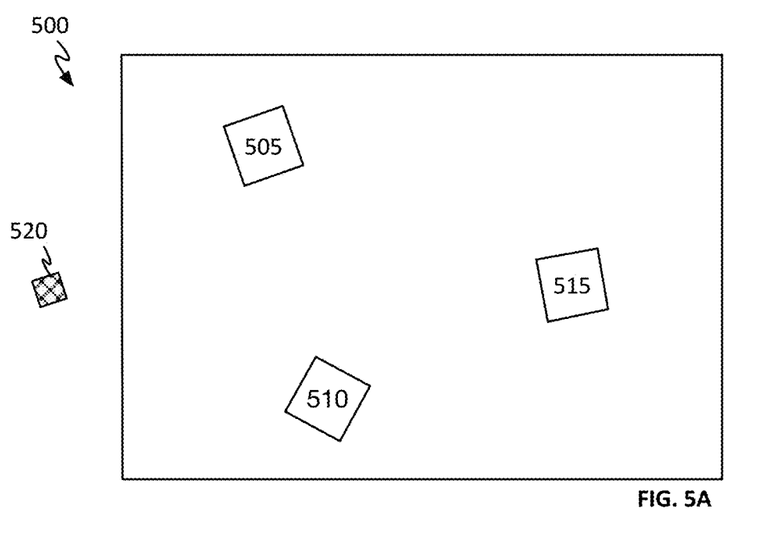
FIGS. 5A-5G illustrate a navigation graph operation in accordance with one embodiment.
Figure 5B:
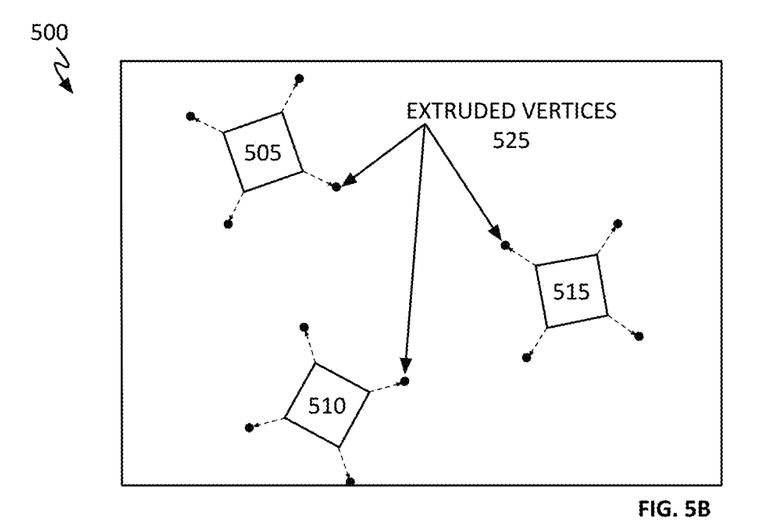
Figure 5C:
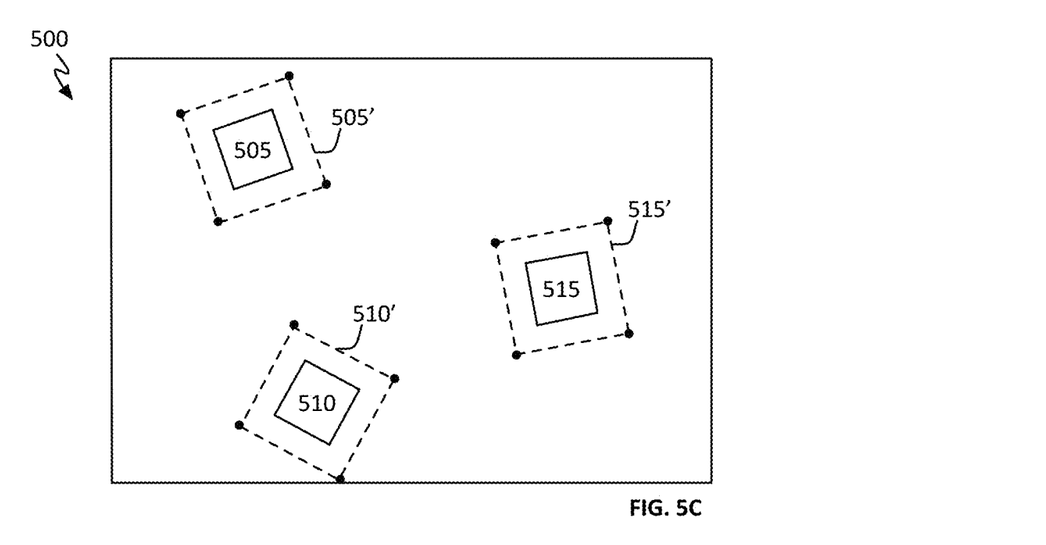
Figure 5D:
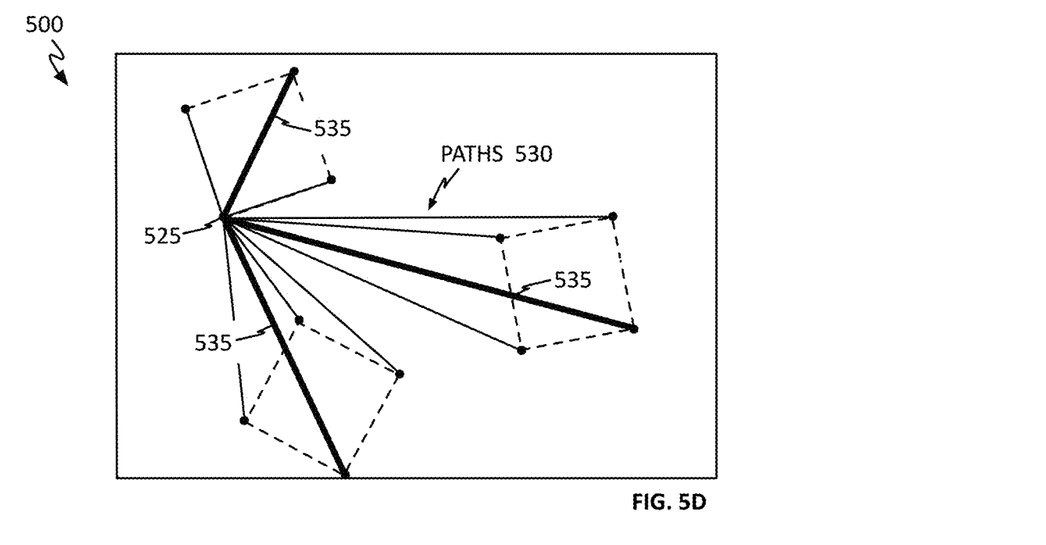
Figure 5E:
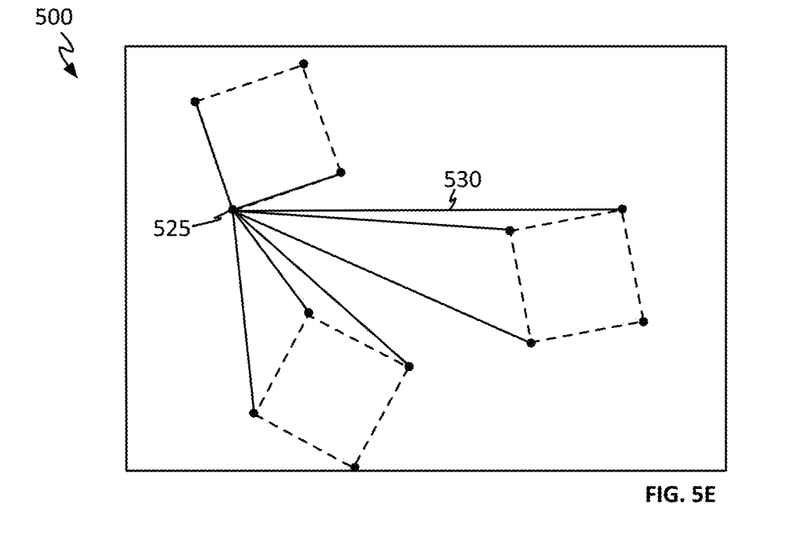
Figure 5F:
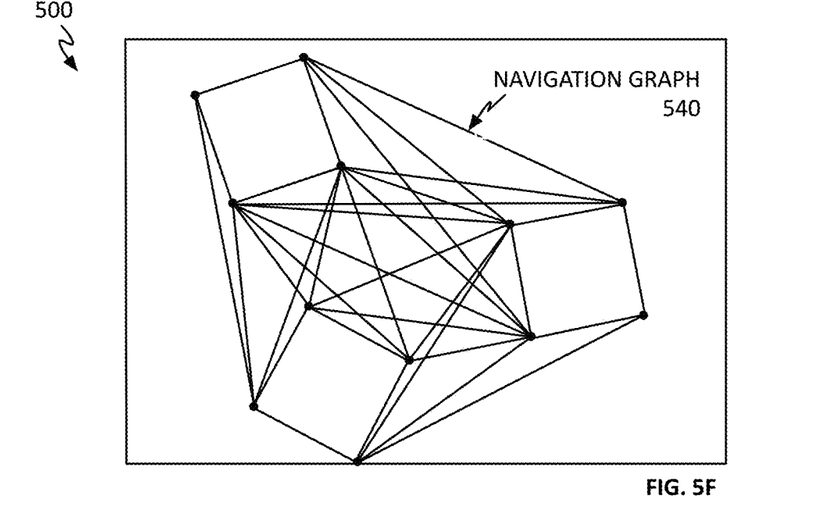

Referring to FIG. 5A, a navigation graph operation in terms of illustrative environment or scene 500 having polygonal obstacles 505, 510 and 515, and agent 520 will be described. As shown in FIG. 5B, each of the three polygonal obstacles 505, 510 and 515 first have their vertices extruded 525. With each obstacle polygon's extruded vertices known, so too are the final navigation graph's nodes as they are the same (see above). Referring now to FIG. 5C, each polygon's extruded vertices may be connected to form extruded objects 505', 510' and 515'. Operationally, extruded objects define regions in scene 500 through which agent 520 cannot pass. Referring to FIG. 5D, and by way of example, extruded vertex 525 extends a possible path 530 from itself to every other extruded vertex in scene 500. Some paths 535 intersect one of the extruded objects meaning they are not viable and should be removed as shown in FIG. 5E. Referring now to FIG. 5F, extending paths 530 for each of the other 11 extruded vertices may result in navigation graph 540.

Figure 5G:
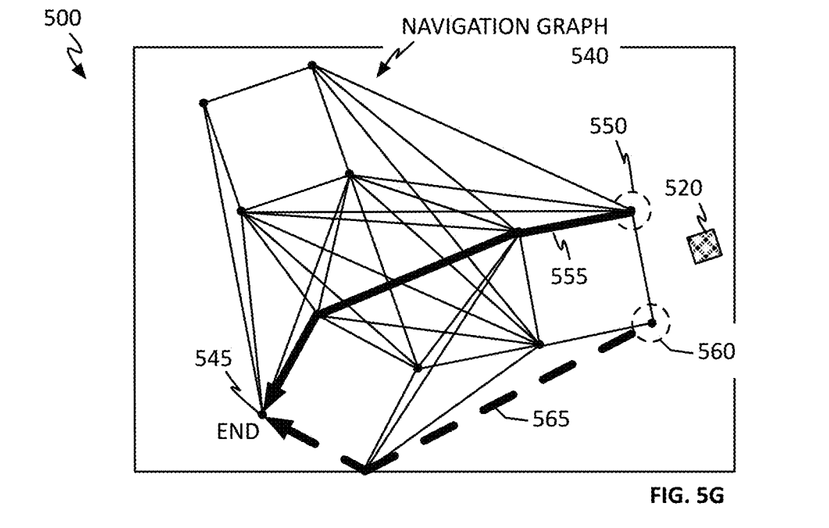

Turning now to FIG. 5G, consider a case where agent 520 begins in scene 500 as shown and wants to move to node or position 545. Agent 520 could, for example, move first to node 550 and take path 555 to end at point 545. Alternatively, agent 520 could move first to node 560 and take path 565 to end at point 545. As shown in FIG. 5G, there are a number of different paths agent 520 may take to get from node 550 to node 545. In one embodiment each edge in navigation graph 540 may have assigned to it a weight or any desired function, and agent may move from start to finish so as to minimize a cost based on edge weight. By way of example, a weight or cost may be assigned to each edge in navigation graph 540 based on its length. In this way minimizing a cost may facilitate agent 520 taking the shortest path between any two locations.

Figure 6:
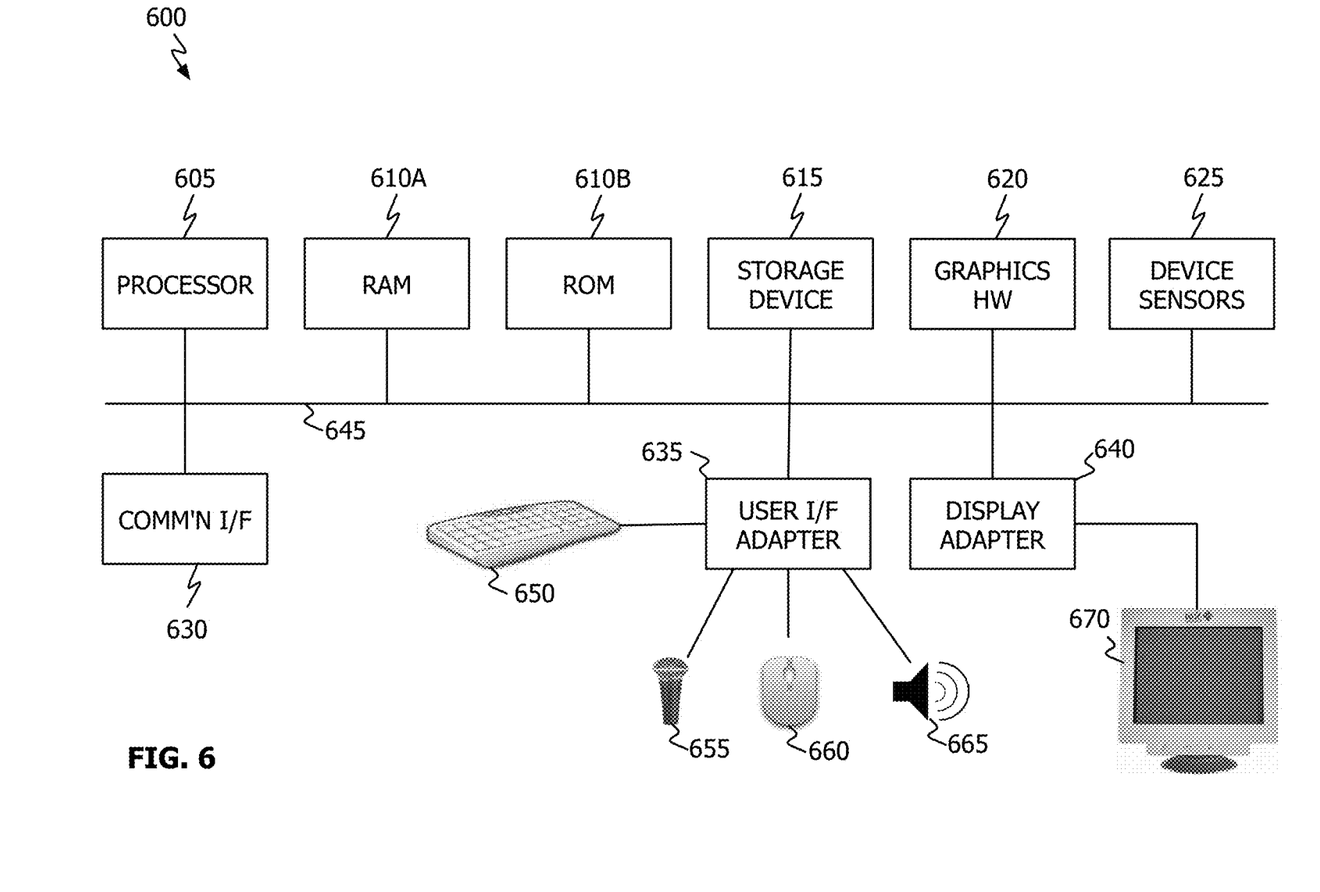
FIG. 6 shows, in block diagram form, a computer system in accordance with one embodiment.

Referring to FIG. 6, the disclosed embodiments to generate a navigation graph in accordance with the above may be performed by representative computer system 600 (e.g., a general purpose computer system such as a desktop, laptop, notebook or tablet computer system). Computer system 600 may include one or more processors 605, memory 610 (610A and 610B), one or more storage devices 615, graphics hardware 620, device sensors 625 (e.g., 3D depth sensor, proximity sensor, ambient light sensor, accelerometer and/or gyroscope), communication interface 630, user interface adapter 635 and display adapter 640—all of which may be coupled via system bus or backplane 645 which may be comprised of one or more continuous (as shown) or discontinuous communication links. Memory 610 may include one or more different types of media (typically solid-state) used by processor 605 and graphics hardware 620. For example, memory 610 may include memory cache, read-only memory (ROM), and/or random access memory (RAM). Storage 615 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 610 and storage 615 may be used to retain media (e.g., audio, image and video files), preference information, device profile information, computer program instructions or code organized into one or more modules and written in any desired computer programming language, and any other suitable data. When executed by processor(s) 605 and/or graphics hardware 620 such computer program code may implement one or more of the methods described herein. Communication interface 630 may be used to connect computer system 600 to one or more networks. Illustrative networks include, but are not limited to, a local network such as a USB network, an organization's local area network, and a wide area network such as the Internet. Communication interface 630 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 635 may be used to connect keyboard 650, microphone 655, pointer device 660, speaker 665 and other user interface devices such as a touch-pad and/or a touch screen (not shown). Display adapter 640 may be used to connect one or more display units 670 which may provide touch input capability. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable GPUs and each such unit may include one or more processing cores.

Figure 7:
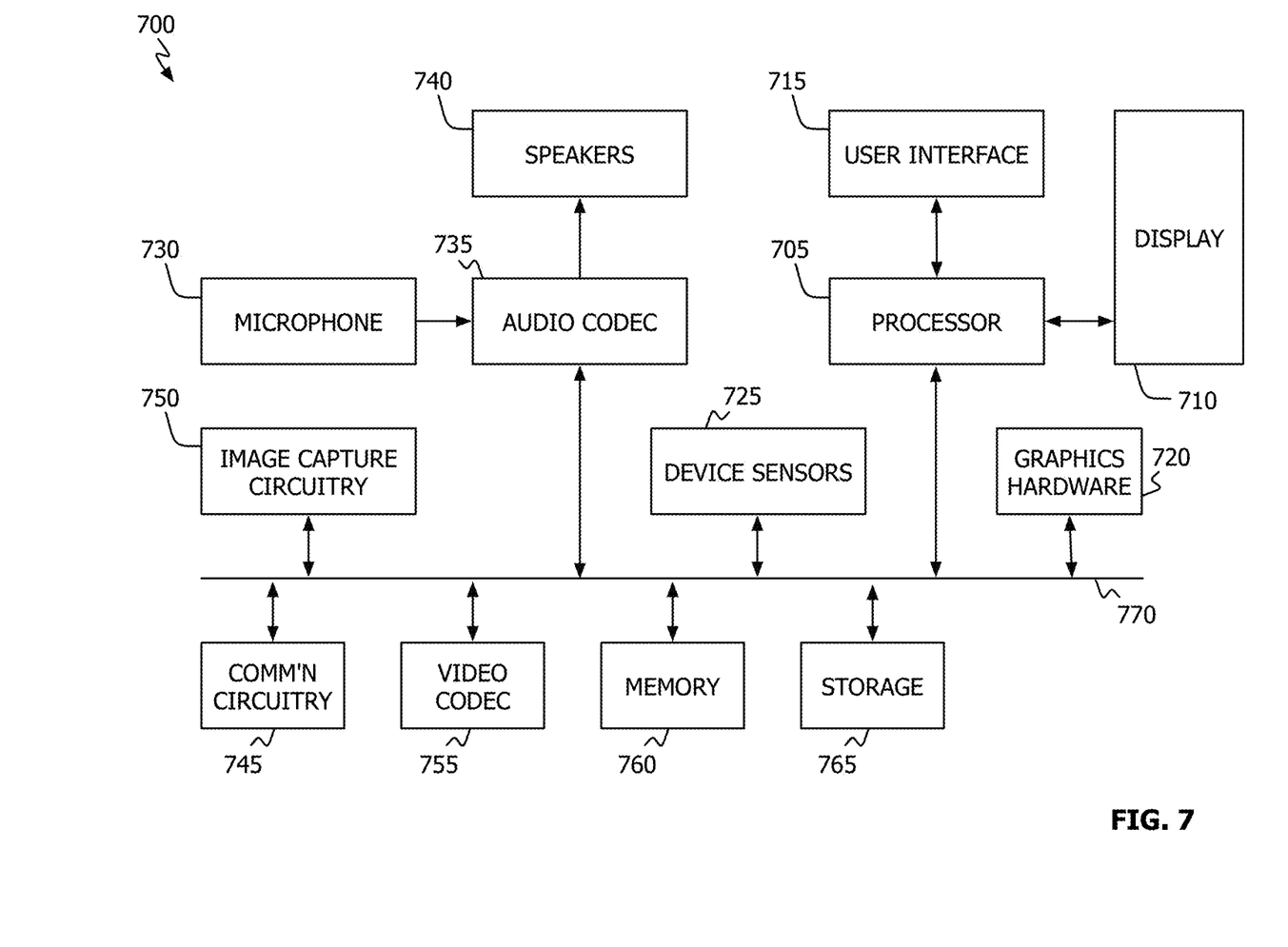
FIG. 7 shows, in block diagram form, a multi-function electronic device in accordance with one embodiment.

Referring to FIG. 7, a simplified functional block diagram of illustrative mobile electronic device 700 is shown according to one embodiment. Electronic device 700 could be, for example, a mobile telephone, personal media device, a notebook computer system, or a tablet computer system. As shown, electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuit or unit 750, video codec(s) 755, memory 760, storage 765, and communications bus 770.

Processor 705, display 710, user interface 715, graphics hardware 720, device sensors 725, communications circuitry 745, memory 760 and storage 765 may be of the same or similar type and/or serve the same function as the similarly named component described above with respect to FIG. 6. Audio signals obtained via microphone 730 may be, at least partially, processed by audio codec(s) 735. Data so processed may be stored in memory 760 and/or storage 765 and/or output through speakers 740. Image capture circuitry 750 may capture still and video images. Output from image capture circuitry 750 may be processed, at least in part, by video codec(s) 755 and/or processor 705 and/or graphics hardware 720, and/or a dedicated image processing unit incorporated within circuitry 750. Images so captured may be stored in memory 760 and/or storage 765.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). The various embodiments have been described, for the most part, in terms of a game application and a single agent. The disclosed techniques are no limited in either of these aspects. Consider for example a mobile robot (agent), a room with a number of objects (environment) and a motion control system (application) that must move the robot through the room. Such a problem may be ideally suited to the disclosed techniques. In addition, multiple agents may be addressed by multiple uses of a single basic implementation, the use of different threads for different agents or graphs. Other uses will be apparent to those of ordinary skill having the benefit of this document. In addition, FIGS. 2 and 3 show flowcharts illustrating different aspects of how to generate a navigation graph in accordance with the disclosed embodiments. In one or more embodiments, one or more of the disclosed steps may be omitted, repeated, and/or performed in a different order than that described herein. Accordingly, the specific arrangement of steps or actions shown should not be construed as limiting the scope of the disclosed subject matter. Further while all of the above described embodiments were two-dimensional in nature, navigation graphs of the type described herein may be implemented for any dimensional space. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to generate and utilize a navigation graph, comprising:
   receiving environment data representing an environment having a plurality of polygonal obstacles;
   receiving object information indicative of a virtual object's size;
   generating an extruded vertex for each vertex of at least two of the plurality of polygonal obstacles by—
      extending, for each edge adjacent to a vertex, a rectangle for a distance based on the virtual object's size, wherein two sides of the rectangle extending from the edge are perpendicular to the edge, a third side of the rectangle is parallel and coincident with the edge and a fourth side is parallel to the edge, and
      identifying, in response to the extended rectangles of the adjacent edges of the vertex intersecting, an intersection point as the extruded vertex, or
      identifying, in response to the extended rectangles of the adjacent edges of the vertex not intersecting, a point at which two lines intersect as the extruded vertex, wherein a first of the two lines is parallel and coincident with the fourth side of one of the extended rectangles and a second of the two lines is parallel and coincident with the fourth side of another of the extended rectangles;
   identifying each extruded vertex as a node in a navigation graph;
   identifying an extruded boundary for each polygonal obstacle, wherein the extruded boundary for each polygonal obstacle is defined by lines connecting adjacent extruded vertices of the polygonal obstacle;
   identifying straight line paths between each extruded vertex and each other extruded vertex as paths of the navigation graph;
   generating modified straight line paths by removing a particular straight line path from the identified straight line paths in response to the particular straight line path intersecting an extruded boundary of one of the at least two of the plurality of polygonal obstacles;
   displaying the environment via a display device;
   identifying a route between a first point and a second point that includes one or more of the modified straight line paths; and
   initiating traversal of the route by the virtual object, wherein initiating traversal of the route by the virtual object includes outputting images depicting the virtual object traversing the route to the display device.

2. The method of claim 1, wherein generating the modified straight line paths further includes:
   identifying a pair of paths of the identified straight line paths, wherein the pair of paths have a same length within a specified length threshold and have a same orientation within a specified orientation threshold;
   including one path of the pair of paths in the modified straight line paths; and
   excluding the other path of the pair of paths from the modified straight line paths.

3. The method of claim 1, wherein a first polygonal obstacle of the at least two of the plurality of polygonal obstacles is convex and a second polygonal obstacle of the at least two of the plurality of polygonal obstacles is concave.

4. The method of claim 1, wherein the virtual object's size corresponds to a bounding radius associated with the virtual object.

5. The method of claim 1, further comprising assigning an edge value to each straight line path included in the modified straight line paths based on the straight line path's length, wherein the route is identified based on at least one edge value of the edge values.

6. An electronic device to generate and utilize a navigation graph, comprising:
   a memory;
   one or more processors coupled to the memory, wherein the one or more processors are configured to execute program code stored in the memory to cause the one or more processors to—
   receive environment data representing an environment having a plurality of polygonal obstacles;
   receive object information indicative of virtual object's size;
   generate an extruded vertex for each vertex of at least two of the plurality of polygonal obstacles by—
      extending, for each edge adjacent to a vertex, a rectangle for a distance based on the virtual object's size, wherein two sides of the rectangle extending from the edge are perpendicular to the edge, a third side of the rectangle is parallel and coincident with the edge and a fourth side is parallel to the edge, and
      identifying, in response to the extended rectangles of the adjacent edges of the vertex intersecting, an intersection point as the extruded vertex, or
      identifying, in response to the extended rectangles of the adjacent edges of the vertex not intersecting, a point at which two lines intersect as the extruded vertex, wherein a first of the two lines is parallel and coincident with the fourth side of one of the extended rectangles and a second of the two lines is a line parallel and coincident with the fourth side of another of the extended rectangles;
   identify each extruded vertex as a node in a navigation graph;
   create an extruded boundary for each polygonal obstacle, wherein the extruded boundary for each polygonal obstacle is defined by lines connecting adjacent extruded vertices of the polygonal obstacle;
   identify straight line paths between each extruded vertex and each other extruded vertex as paths of the navigation graph;
   generate modified straight line paths by removing a particular straight line path from the identified straight line paths in response to the particular straight line path intersecting an extruded boundary of one of the at least two of the plurality of polygonal obstacles;
   display the environment via a display device;
   identify a route between a first point and a second point that includes one or more of the modified straight line paths; and
   initiate traversal of the route by the virtual object, wherein initiating traversal of the route by the virtual object includes outputting images depicting the virtual object traversing the route to the display device.

7. The electronic device of claim 6, wherein the program code to cause the one or more processors to generate the modified straight line paths further includes program code to cause the one or more processors to:
   identify a pair of paths of the identified straight line paths, wherein the pair of paths have a same length within a specified length threshold and have a same orientation within a specified orientation threshold;
   include one path of the pair of paths in the modified straight line paths; and
   exclude the other path of the pair of paths from the modified straight line paths.

8. The electronic device of claim 6, wherein a first polygonal obstacle of the at least two of the plurality of polygonal obstacles is convex and a second polygonal obstacle of the at least two of the plurality of polygonal obstacles is concave.

9. The electronic device of claim 6, wherein the virtual object's size corresponds to a bounding radius associated with the virtual object.

10. The electronic device of claim 6, wherein the program code is further executable to cause the one or more processors to assign a weighting value to each straight line path of the modified straight line paths based on the straight line path's length.

11. A non-transitory program storage device comprising instructions stored thereon, which when executed by one or more processors, cause the one or more processors to:
   receive environment data representing an environment having a plurality of polygonal obstacles;
   receive object information indicative of a virtual object's size;
   generate an extruded vertex for each vertex of at least two of the plurality of polygonal obstacles by:
      extending, for each edge adjacent to a vertex, a rectangle for a distance based on the virtual object's size, wherein two sides of the rectangle extending from the edge are perpendicular to the edge, a third side of the rectangle is parallel and coincident with the edge and a fourth side is parallel to the edge, and
      identifying, in response to the extended rectangles of the adjacent edges of the vertex intersecting, an intersection point as the extruded vertex, or
      identifying, in response to the extended rectangles of the adjacent edges of the vertex not intersecting, a point at which two lines intersect as the extruded vertex, wherein a first of the two lines is parallel and coincident with the fourth side of one of the extended rectangles and a second of the two lines is parallel and coincident with the fourth side of another of the extended rectangles;
   identify each extruded vertex as a node in a navigation graph;
   create an extruded boundary for each polygonal obstacle, wherein the extruded boundary for each polygonal obstacle is defined by lines connecting adjacent extruded vertices of the polygonal obstacle;
   identify straight line paths between each extruded vertex and each other extruded vertex as paths of the navigation graph;
   display the environment via a display device;
   generate modified straight line paths by removing a particular straight line path from the identified straight line paths in response to the particular straight line path intersecting an extruded boundary of one of the at least two of the plurality of polygonal obstacles;
   identify a route between a first point and a second point that includes one or more of the modified straight line paths; and
   initiate traversal of the route by the virtual object, wherein initiating traversal of the route by the virtual object includes outputting images depicting the virtual object traversing the route to a display device.

12. The non-transitory program storage device of claim 11, wherein the instructions to cause the one or more processors to generate the modified straight line paths further include instructions to cause the one or more processors to:
   identify a pair of paths of the identified straight line paths, wherein the pair of paths have a same length within a specified length threshold and have a same orientation within a specified orientation threshold;
   include one path of the pair of paths in the modified straight line paths; and
   exclude the other path of the pair of paths from the modified straight line paths.

13. The non-transitory program storage device of claim 11, wherein a first polygonal obstacle of the at least two of the plurality of polygonal obstacles is convex and a second polygonal obstacle of the at least two of the plurality of polygonal obstacles is concave.

14. The non-transitory program storage device of claim 11, wherein the virtual object's size corresponds to a bounding radius associated with the virtual object.

15. The non-transitory program storage device of claim 11, further comprising instructions to cause the one or more processors to assign a weighting value to each straight line path of the modified straight line paths based on the straight line path's length.

* * * * *

UNITED STATES PATENT AND TRADEMARK OFFICE
CERTIFICATE OF CORRECTION

PATENT NO.       : 9,975,040 B2
APPLICATION NO.  : 14/732744
DATED            : May 22, 2018
INVENTOR(S)      : Norman N. Wang et al.

It is certified that error appears in the above-identified patent and that said Letters Patent is hereby corrected as shown below:

In the Claims

Claim number 6, at Column 8, Line numbers 45-46, "rectangles and a second of the two lines is a line parallel" should read -- rectangles and a second of the two lines is parallel --

Signed and Sealed this
Seventh Day of August, 2018

Andrei Iancu
*Director of the United States Patent and Trademark Office*